Figure 1:
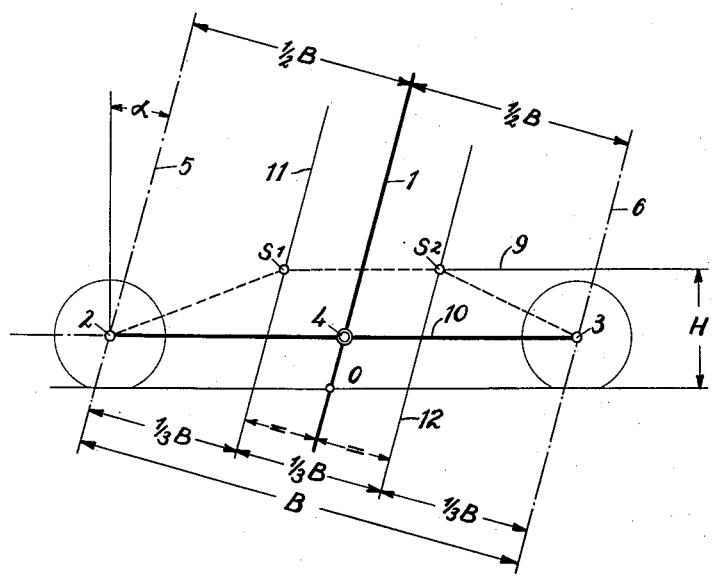

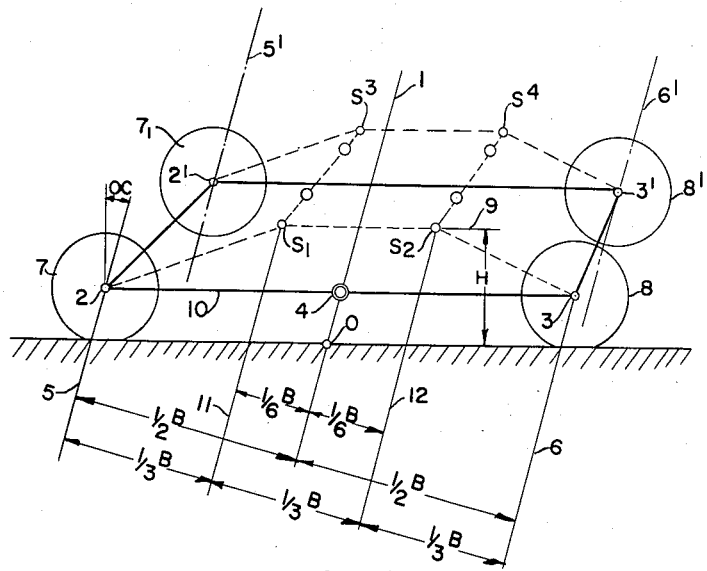

United States Patent Office 2,831,724
Patented Apr. 22, 1958

2,831,724
SEATING ARRANGEMENT FOR AUTOMOBILES

Bela Barenyi, Stuttgart-Hohenheim, Germany, assignor to Daimler-Benz Aktiengesellschaft, Stuttgart-Unterturkheim, Germany Application February 23, 1955, Serial No. 489,980

2 Claims. (Cl. 296—64)

The present invention relates to a seating arrangement for passenger automobiles having two rows of seats mounted between the axles.

It is an object of the invention to provide the best possible arrangement of the seats between the axles of a passenger car, so as to afford the passengers the greatest possible comfort, taking into consideration the structure of the average human body.

Another object of the invention is to provide such a seat arrangement at the least possible expense, and to utilize the space within the car as economically as possible without reducing the comfort of the passengers.

A principal feature of the invention resides in providing a seat arrangement suitable to accommodate passengers with the centers of gravity of the passengers which are assumed to be of average height and weight and which are assumed to be in the normal position when seated in the seats. The passengers are thus accommodated in each row of seats which are arranged symmetrically in the longitudinal direction of the car with respect to an inclined transverse central plane having an angle of inclination $\alpha$ of approximately 15° to the perpendicular.

More specifically it is a preferred feature of the invention to provide such seat arrangement by making the distances from this central plane of the two rows of seats supporting such centers of gravity so as to be equal to each other. Also, the perpendicular distance from the line of centers of gravity of the front row of seats to the plane passing through the front axle parallel to the aforesaid central plane is equal to the perpendicular distance from the line of centers of gravity of the rear row of seats to the plane passing through the rear axle parallel to the said central plane. The angle of 15°, although accurately maintained in a preferred embodiment of the invention, constitutes a mean value for the direction of the resultant of the jars to which the car is subjected when driving over uneven ground.

Further objects, features, and advantages of the invention will be apparent from the following detailed description thereof and the accompanying drawing, in which Figure 1 shows diagrammatically a side view of a passenger automobile with a seat arrangement according to the invention Figure 2 shows a perspective view, and Figure 3 shows an interior side view of an automobile including the disposition of the seats disclosed.

Referring to the drawing figures, the transverse central plane 1 of the car is equidistantly spaced from the center lines 2 and 3 of the front and rear axles of a passenger automobile having two rows of seats equally spaced from this plane. The transverse central plane 1 extends along an angle $\alpha$ of approximately 15° to the perpendicular, and intersects at a point 4 a horizontal plane passing through the centers 2 and 3 of the axles. Planes 5 and 6 also pass through the axle centers 2 and 3 and extend parallel to the transverse central plane 1. The perpendicular distance between these planes 5 and 6 constitutes the base B of the seat arrangement according to the invention which is separated into two equal sections by the transverse central plane 1. For the usual type of car, this base B may be given, for example, a mean value of (2550 mm.) approximately 100 inches (100.3935").

According to the present invention, the row designated $S^1$ in Figures 1 and 3 and $S^1$, $S^3$ in Figure 2 represents the centers of gravity of the average front passengers and is disposed in the front half of base B of the vehicle while the row designated $S^2$ in Figures 1 and 3 and $S^2$, $S^4$ in Figure 2 represents the centers of gravity of the average rear passengers and is disposed in the rear half of the base B. These rows represent centers of gravity of passengers of average height and weight. The seats shown in Figure 3 are so arranged and constructed as to accommodate the passengers whose centers of gravity coincide with the aforementioned rows, it being assumed in this application that these centers of gravity are those of average passengers when in their normal positions. Both rows are equidistantly spaced from the transverse central plane 1. In the particular embodiment shown in the figures of the drawing, the distance between the two rows $S^1$, $S^3$ and $S^2$, $S^4$ of the centers of gravity of the passengers actually amounts to one third of the base B, so that this distance and the distances of the rows $S^1$, $S^3$ and $S^2$, $S^4$ from the axial planes 5 and 6 are equal. The distance H of the rows $S^1$, $S^3$ and $S^2$, $S^4$ of the centers of gravity from the ground results from the clearance of the car from the ground and the shape of the seats. Thus, it depends upon the particular type of car, and may in the usual car have, for example, a mean value of about (675 mm.) or 26½ inches.

In the figures of the drawing, reference numeral 9 represents a plane which is determinative of the position of the rows $S^1$, $S^3$, and $S^2$, $S^4$ (Figure 2) above the ground. This plane extends parallel to plane 10 which passes through the centers of the vehicle wheels. Reference numerals 11 and 12 represent planes which extend parallel to the central plane 1 and are equidistant therefrom. The distance of plane 11 from plane 5, the distance of plane 11 from plane 12 and the distance of plane 12 from plane 6 are all equal. Thus, these planes 11 and 12 determine the distance of the rows $S^1$, $S^3$, and $S^2$, $S^4$ from the central plane 1 and from the planes 5 and 6 passing through the wheel centers. The centers of gravity of the passengers as indicated by the rows $S^1$, $S^3$, and $S^2$, $S^4$ are located on lines constituting the intersections of plane 9 with the two planes 11 and 12. As illustrated in Figure 3, plane 9 intersects the backs of the seats of the automobile and the planes 11 and 12 intersect the bottoms of these seats. Since, as said before, the central plane 1 is inclined 15° to the perpendicular, indicated by $\alpha$ in Figures 1 and 2, it necessarily follows that the planes 11 and 12, being parallel to the central plane 1, are likewise inclined 15° to the perpendicular, which, as shown in these figures, is that erected on plane 10.

The four wheels of the vehicle, 7, 7', 8, 8' including their centers 2, 2', 3, 3', together with the plane 5, 5' and the plane 6, 6' passing through these centers are shown in Figure 2. These planes are indicated in Figures 1 and 3 by reference numerals 5 and 6.

The seat arrangement as illustrated in the drawing represents the best possible in order to obtain the highest comfort of the passengers in the moving car as well as a very economical distribution of the space within the car.

While I have described my invention with reference to the preferred embodiments thereof I wish to have it understood that it is in no way limited to the details of such embodiments or to the specific examples described, but is capable of numerous modifications within the scope of the appended claims.

What I claim is:

1. A seat arrangement for passenger motor vehicles having front and rear axle means and wheels supported on said axle means on opposite sides of the vehicle, two rows of seats located between said vehicle axle means to accommodate thereon passengers of average height and weight with the centers of gravity of the passengers when in normal position in each row located on lines constituting the intersections of a plane parallel to the horizontal plane through the wheel centers with transverse planes forming angles of 15° to the perpendiculars to said horizontal plane, the bottoms of said seats being so disposed as to be intersected by said transverse planes, the backs of said seats being so disposed as to be intersected by said parallel plane, the distance of said transverse planes from each other, the distance from the forward one of said transverse planes to a parallel plane passing through the front wheel centers, and the distance from the rear one of said transverse planes to a parallel plane passing through the rear wheel centers, being all equal.

2. A seat arrangement according to claim 1, wherein said transverse planes are parallel with and equally spaced from another transverse plane, said horizontal plane through the wheel centers being intersected midway between the front and rear wheel centers by said last-named transverse plane.

References Cited in the file of this patent

UNITED STATES PATENTS 2,128,930 Fageol et al. _____ Sept. 6, 1938

FOREIGN PATENTS 171,215 Germany _____ May 10, 1952